United States Patent Office 3,015,165
Patented Jan. 2, 1962

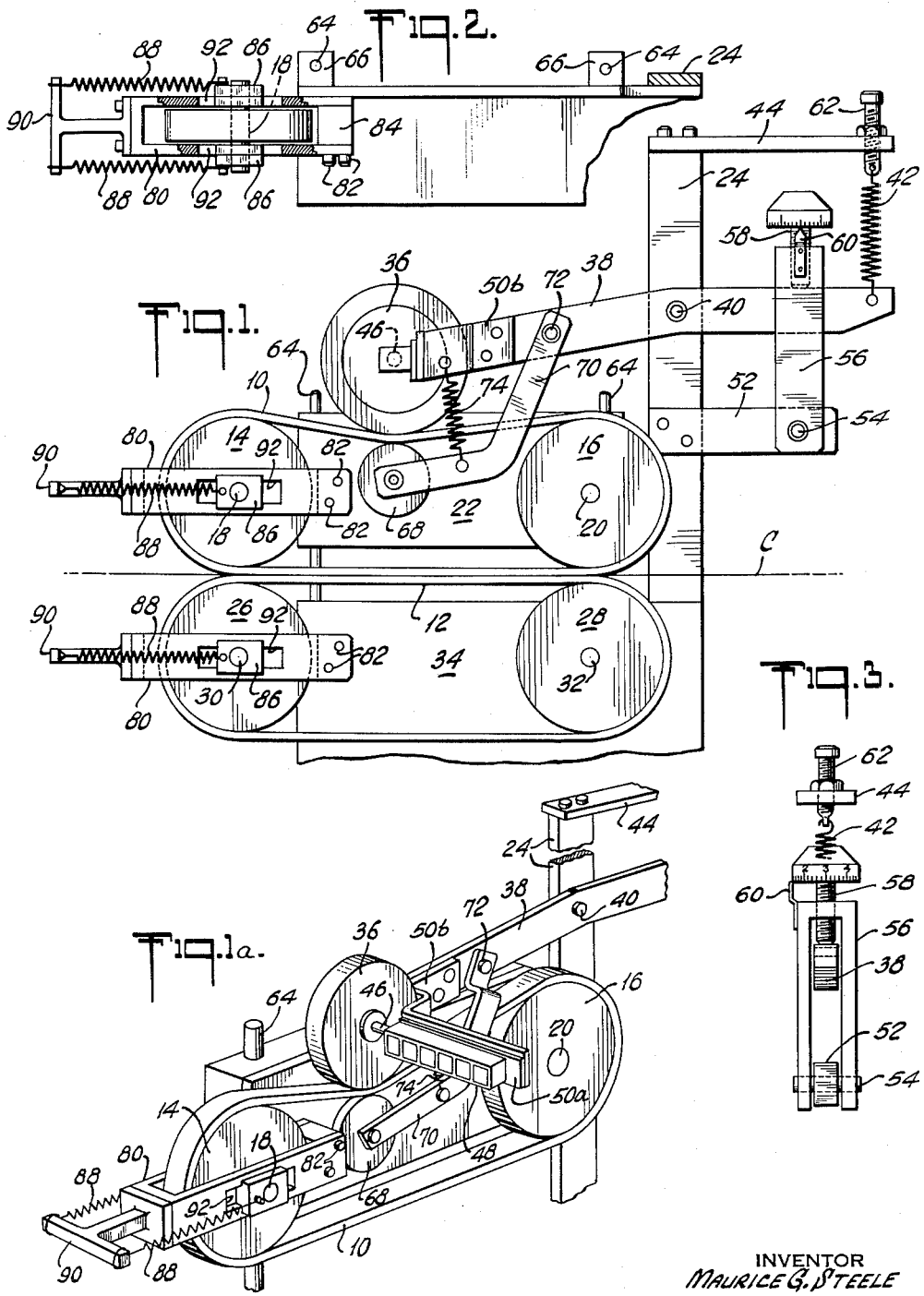

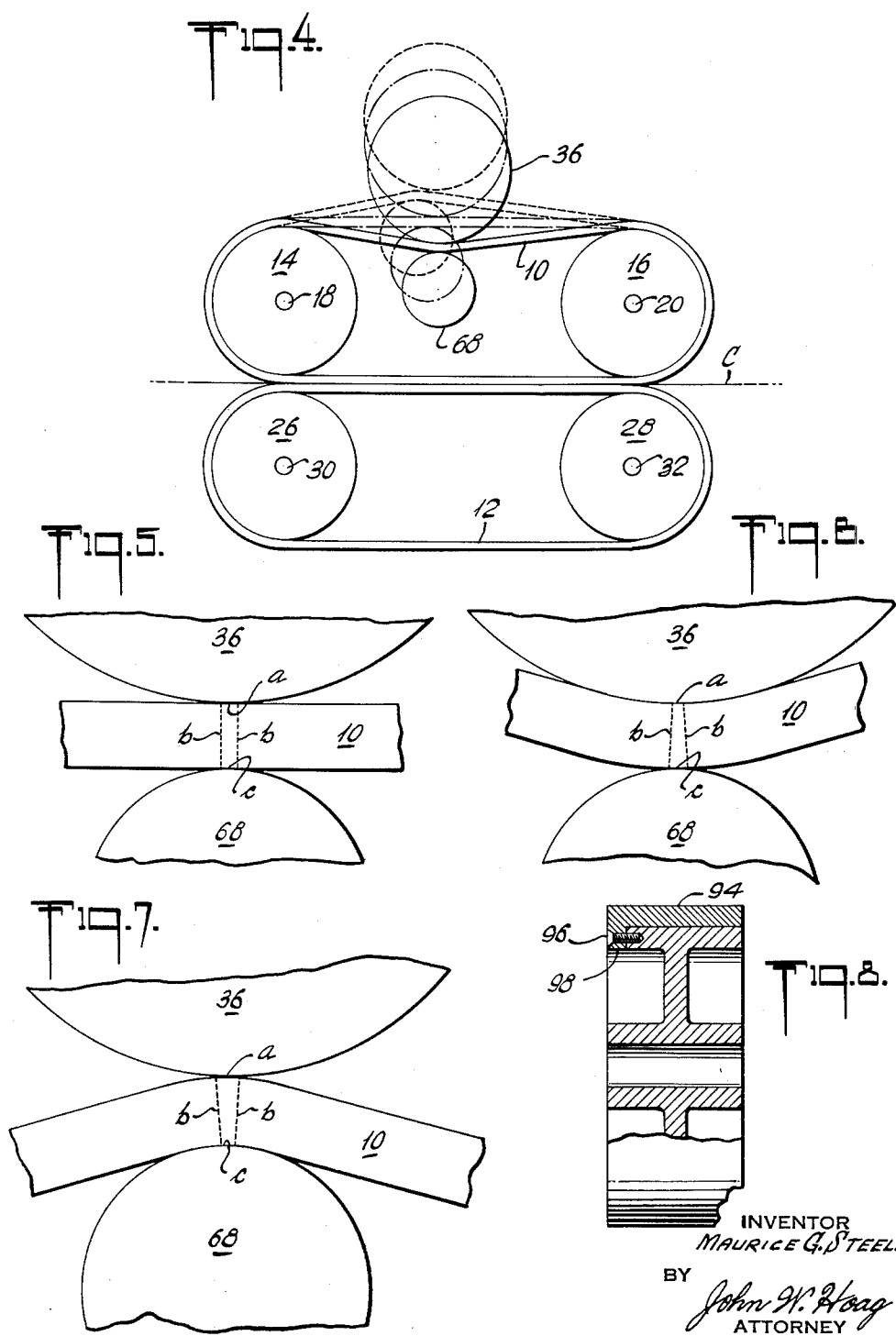

3,015,165
ROLLING CONTACT MEASURING DEVICE
Maurice G. Steele, Rome, N.Y., assignor, by mesne assignments, to Rome Cable Corporation, Rome, N.Y., a corporation of Delaware
Filed Dec. 15, 1959, Ser. No. 859,692
10 Claims. (Cl. 33—134)

This invention relates to apparatus for measuring the length of travelling strands, such for example as a travelling insulated or bare electrical conductor.

Insulated conductors are ordinarily priced at so much per foot. The manufacturer usually supplies insulated conductors in long lengths which are produced at high speed, and it would be impractical to measure the lengths by hand. Devices which have been proposed for measuring a travelling strand have employed counter means attached to the shaft of a wheel around which passes a belt which is in frictional contact with the travelling strand. They have not proven satisfactory because they are not able to compensate for errors inherent in the devices, as is more fully explained herein. It will be appreciated that in sales which often involve thousands of feet a measurement error of even 1% would be a serious matter.

Accordingly it is an object of this invention to provide improved means for measuring the length of a travelling insulated conductor.

Another object of the invention is to provide means for measuring the length of a travelling strand which is not affected by slippage of a belt relative to a pulley on which it is supported.

Another object of the invention is to provide measuring means whereby a small error may be compensated for.

The invention will best be understood if the following description is read in connection with the accompanying drawings in which FIGURE 1 is a side elevation of apparatus employing my invention.

FIGURE 1a is a perspective view of the apparatus shown in FIGURE 1.

FIGURE 2 is a detail view in partial section showing slide means by means of which one pulley of one or both pairs may be movable with respect to the other pulley of a pair in order to take up slack in the belt which encircles the pair of pulleys.

FIGURE 3 is a right hand end elevation of the adjustment portion of the device shown in FIGURE 1.

FIGURE 4 is a side elevation showing the belt in straight line position (broken lines) and also in two other positions, in which it is offset from a straight line position, both downwardly from its straight line position (solid lines), and upwardly from its straight line position (broken lines).

FIGURE 5 is a diagrammatic view illustrating that when the belt is in straight line position its upper and lower surfaces are under equal stress and there is no stretching or shortening of either the upper or lower surface of the belt.

FIGURE 6 is a diagrammatic view illustrating how the upper surface of the belt is shortened and the lower surface is lengthened when it is moved away from a straight line position in a direction to make the depressed portion of the belt concave.

FIGURE 7 is a diagrammatic view showing how the upper surface of the belt is lengthened and the lower surface of the belt is shortened when the belt is moved away from a straight line position into a position in which it assumes a convex form, and FIGURE 8 is a vertical sectional view of pulley 36 with a removable tire around its periphery.

As illustrated in the drawing a length of insulated conductor C to be measured passes between, and in frictional contact with, the belts 10 and 12.

Belt 10 is mounted for rotation around spaced pulleys 14, 16 mounted on shafts 18 and 20 respectively which project laterally from the horizontal support member 22 which is above the travelling conductor and is adapted to slide vertically on vertical guide posts 64, 64 in bearing blocks 66, 66 which are rigidly attached to member 22. Guide posts 64, 64 are rigidly attached to lower support member 34.

Similarly belt 12 is mounted for rotation around pulleys 26, 28 mounted on shafts 30 and 32 respectively which project laterally from the horizontal support member 34.

It will be understood that fractional contact between the travelling conductor C and the lower and upper flights of said belts 10 and 12 respectively causes the belts to move in an endless path around their supporting pulleys.

In the illustrated embodiment of the invention I do not employ counter mechanism attached to one of the shafts of the pulleys on which the belts 10 and 12 are supported. Instead I attach counter mechanism to the shaft of an idler pulley 36 which I provide to rest upon the upper flight of belt 10 above and between its supporting pulleys 14 and 16. This has the advantage that the idler pulley travels on the outside surface of the belt, as does the travelling member being measured whereas, the periphery of a belt supporting pulley is in contact with the under surface of the belt. However, while this is an improvement over a device having the counter mechanism on the shaft of a belt suporting pulley it does not overcome all error in measuring. The effective pitch line of the idler pulley 36 is not the line which is defined by the periphery of pulley 36, or any belt driven pulley, but is a circle which lies outside the periphery of the pulley, the radius of which is equal to the radius of the pulley plus approximately one-half the thickness of the belt.

And, even assuming there is no slippage between the belts and the travelling member, nor between the upper belt 10 and the idler pulley 36, the weight of the idler pulley 36, and the force employed to hold it in effective frictional engagement with the belt, tend to displace the upper flight of the belt from a straight line position and to depress it so that the portion in contact with the idler pulley is slightly concave, thus introducing another potential source of error.

I compensate from any error in measuring resulting from this cause, or from any other cause, by moving the portion of the belt contacted by idler pulley 36 toward or away from a straight line position, and I provide means for doing this by very accurately controlled amounts and while the idler pulley 36 remains in operative relation to the belt for actuating the counter mechanism.

I provide a second idler pulley 68 which bears upwardly against the under surface of the belt directly below the point of contact of the main idler pulley with the upper surface of the belt, and I provide means by which both of said idler pulleys may be moved simultaneously toward or away from a straight line position of the belt, thus changing the curvature of the portion of the belt which passes between them.

By moving the idler pulleys 36 and 68 simultaneously in the same direction in their common plane, the portion of the belt which passes between said idler pulleys is moved toward or away from the straight line position of the upper flight of belt 10. In this manner an error of the measuring means, arising from any cause, including those mentioned above, may be compensated for and substantially corrected as will be more fully explained.

As shown in FIGURE 1 the idler pulley 36 is mounted for rotation on shaft 46 at one end of a swing arm 38 which is pivotally supported intermediate its ends on pivot 40 which projects laterally from vertical standard 24 above the horizontal support arm 22. A spring 42 is connected between the other end of arm 38 and the arm 44, which projects from vertical standard 24 in a direction opposite to the horizontal pulley support arms 22 and 34 the said spring acting to elevate the rear end of arm 38 and to lower the front end of arm 38 for the purpose of effecting and maintaining frictional contact between the main idler pulley 36 and the upper flight of belt 10. The tension of this spring may be adjusted by means of adjusting screw 62. Rotation of idler pulley 36 and its shaft 46 actuates counter means 48 of any known kind, indicated in FIGURE 1a supported on the arm 50a of an angle bracket 50, the other arm 50b of which is fastened to arm 38.

The idler pulley 68 is mounted at one end of auxiliary swing arm 70 the other end of which is secured at 72 on arm 38. Pulley 68 is yieldingly pressed against the underside of the upper flight of belt 10 directly opposite pulley 36 by spring 74 which extends between arms 38 and 70 as shown. The upper flight of belt 10 thus travels between pulleys 36 and 68 and if these pulleys are raised or lowered the position of the upper flight of belt 10 is changed accordingly.

A graduated adjusting screw 58 makes vertical contact with the upper edge of pivoted arm 38 on the end which is connected to spring 42 and is remote from idler pulley 36 as shown. This screw is rotatably mounted in a suitably tapped hole in a yoke-like link 56 which is pivoted at 54 on a secondary support arm 52 fastened also to vertical standard 24. FIGURE 3 shows an end view of these elements. It will be seen that this screw 58 is opposed to the tension of spring 42 so that, as the screw is turned, the sub-assembly comprising arms 38 and 70 will be moved up or down.

Referring again to FIGURES 1 and 2, it will be seen that the left-hand pulleys 14 (upper) and 26 (lower) are mounted in yoke-like supports 80, 80. FIGURE 2 is a top view of this construction. These supports are firmly fastened to upper pulley support plate 22 and lower frame 34 by suitable fasteners 82, 82, 82, 82, with intervening filler blocks 84, 84. These two pulleys are slidably mounted horizontally by means of stepped slide blocks 86, 86 which are free to slide in horizontal slots 92, 92. The pulleys 14 and 26 are preferably ball-bearing mounted so that they are free to turn on shafts 18 and 30 respectively, which are integral with, or rigidly fastened to, slide blocks 86, 86. This permits the pulleys to slide freely back and forth horizontally in supports 80, 80.

Attached to the left-hand end of each support is a double spring mount 90, 90 to which suitable tension springs 88, 88, 88, 88 may be attached, with their opposite ends being attached to slide blocks 86, 86, 86, 86. It will be seen that these springs tend to pull pulleys 14 and 26 to the left. This has two important effects. First, for any setting of the device it tends to keep both belts 10 and 12 taut at all times whereby they will more firmly make continuous frictional contact with linear element C and any undesirable slipping will be avoided. Second, when adjusting screw 58 is turned to cause pulleys 36 and 68 to move the upper flight of belt 10 toward a straight line position all slack in the belt will automatically be taken up by springs 88, 88 pulling on pulley 14. This insures a tight belt 10 regardless of the position assumed by the belt.

When the upper flight of belt 10 is a straight line the upper and lower surfaces of the portion contacted by pulleys 36 and 68 are equal in length. But when the upper flight of the belt is distorted into a curved line the surface of one side or the other side of the curved belt portion is compacted and shortened, and its other surface is stretched and lengthened, as illustrated in FIGURES 5, 6 and 7.

Thus when the upper flight of belt 10 is depressed below the horizontal position, as shown in full lines FIGURE 4, the cross-sectional shape of the portion of the belt which rotates idler pulley 36 changes from a rectangle (FIGURE 5) to a trapezoidal shape (FIGURE 6) in which its vertical sides $b$, $b$ are no longer parallel. Tensile stresses have caused a shortening of the upper surface $a$ of the portion of belt 10 which is contacted by pulley 36 and a lengthening of the lower surface $c$ of said portion.

Conversely if the belt is raised above the horizontal position the situation is reversed, as shown in FIGURE 7, and dimension $a$ will be longer than dimension $c$.

Accordingly if for any reason the device is not correctly measuring the length of a travelling member an error on the order of 1% may be compensated for and substantially eliminated by moving the flight of belt 10 toward or away from a straight line position, in a direction to shorten or lengthen the portion of the belt surface which actuates the counter means through contact with pulley 36, to the extent required.

I have obtained very satisfactory results with the apparatus described herein. By mounting counter mechanism on the shaft of the idler pulley 36 which rides on the upper surface of the upper flight of belt 10 I find that the error in measurement, if any, is very small and on the order of 1% or less, and that by raising or lowering the combination of idler pulleys and the portion of the upper flight of the belt which passes between them this error may be entirely eliminated or reduced to such a small amount as to be negligible. By turning adjustment screw 58, the periphery of which is calibrated for coaction with a point of reference supplied by the pointer 60 mounted on link member 56, the combination of said idler pulleys and said belt portion may be raised and lowered by very small amounts, and once the degree of error has been established it is only necessary to maintain the setting of the adjustment screw while measuring a long length of wire, cable and the like.

FIGURE 8 shows a preferred construction of idler counter pulley 36 comprising a dependable, easily removable and replaceable tire 94 as its frictional contact surface. If the surface of the tire becomes worn to the extent that the error which such wear causes cannot be compensated for by means described above, or if for any reason the circumference of the pulley is incorrect, a new tire of optimum circumference may be quickly substituted therefor. As shown in FIGURE 8 the body of the idler pulley is stepped down on one face and the tire 94 has a flanged portion 98 extending into the space provided by the stepping down of the body of the pulley, and the tire is secured to the body of the pulley by means of screws 96 which pass through the flanged portion 98 of the tire into the body of the pulley.

There has thus been provided an apparatus by which the above-stated objects are attained in a thoroughly practical manner.

What I claim is:

1. Apparatus for measuring a travelling strand which comprises, a first pair of pulleys spaced apart and a first belt passing around the pulleys comprising said first pair, a second pair of pulleys spaced apart and a second belt passing around the pulleys comprising said second pair, the pairs of pulleys being disposed so that the first belt in passing through one of its flights is directly opposed to the second belt while the latter is passing through one of its flights and so that a travelling strand passing between the opposed flights of the belts is in frictional contact with the belts and thus imparts its movement to said belts, first and second idler pulleys disposed in contact with, and on opposite sides of, a flight of one of the belts, and means for moving said idler pulleys in unison to move the portion of the belt passing between them toward and away from a straight line position, and counter mechanism on the shaft of one of said idler pulleys and actuated by the rotation of the pulley and shaft caused by contact between said pulley and said belt.

2. The device claimed in claim 1 including means tending to move one pulley, of the pair supporting the belt which passes between said idler pulleys, away from the other to take up slack in the belt.

3. Apparatus for measuring a travelling strand which comprises, a first pair of pulleys spaced apart and a first belt passing around said pulleys, a second pair of pulleys disposed, and a second belt passing around the pulleys comprising the second pair, the pairs of pulleys being disposed so that the first belt in passing through one of its flights is directly opposed to the second belt while the latter is passing through one of its flights and so that a travelling strand passing between the opposed flights of the belts is in frictional contact with the belts and thus imparts its movement to said belts, an idler pulley, and means for mounting said pulley for swinging movement toward and away from an intermediate portion of the flight of one of said belts which is not opposed to the flight of the other of said belts.

4. The device claimed in claim 1 including means for mounting one of the pulleys of each of the pairs of pulleys so that it is movable toward or away from the other pulley comprising the pair, and means biasing the movable pulley of each pair away from the other pulley comprising the pair to take up slack in the belts surrounding said pairs respectively.

5. The device claimed in claim 3 including means for controlling the position of the idler pulley mounting means to increase or decrease the thrust of said pulley against the said portion of the belt and thereby also control the extent to which said idler pulley causes the belt to deviate from a straight line position in passing through its said flight, and means for exerting a thrust on the opposite side of the belt from said idler pulley.

6. Apparatus for measuring a travelling strand which comprises, a first pair of pulleys spaced apart and disposed in alignment and a first belt passing around said pulleys, a second pair of pulleys disposed in alignment and a second belt passing around the pulleys comprising said second pair, the pairs of pulleys being disposed so that the first belt in passing through one of its flights is directly opposed to the second belt while the latter is passing through one of its flights, and so that a travelling strand passing between the opposed flights of the belts is in frictional contact with the belts, a pair of idler pulleys disposed on opposite sides of one of the flights of one of said belts, means for urging each of said idler pulleys against the belt, support means for said idler pulleys, and means for adjusting the position of said idler pulleys to cause them to control the position of the flight of the belt passing between them and to move it toward and away from a straight line position, a counter, and a counter shaft, one of said idler pulleys being fixed on the counter shaft.

7. Apparatus for measuring a traveling strand comprising, an endless belt for making contact with the traveling strand and arranged to be driven thereby, means coacting with said belt to maintain frictional contact between the strand and said belt, an idler pulley, and means for supporting the idler pulley to ride on the outer surface of said belt, a counter means, and means responsive to the rotation of said idler pulley for actuating said counter means.

8. Apparatus claimed in claim 7 in which the means for supporting the idler pulley is adjustable to move the idler pulley toward and away from an intermediate portion of the flight of said belt which is not in contact with the traveling strand.

9. The apparatus claimed in claim 8, including a second idler pulley and means for supporting it to press against the inside surface of said belt in opposed relation to said first idler pulley.

10. The apparatus claimed in claim 9 including means for moving the idler pulleys in unison to move the portion of the belt passing between them toward and away from a straight line position.

References Cited in the file of this patent

UNITED STATES PATENTS

| | | |
|---|---|---|
| 1,415,483 | Reichmann | May 9, 1922 |
| 2,707,332 | Smith | May 3, 1955 |

FOREIGN PATENTS

| | | |
|---|---|---|
| 635,197 | Great Britain | Apr. 5, 1950 |